US 11,707,668 B2

(12) United States Patent
Park

(10) Patent No.: US 11,707,668 B2
(45) Date of Patent: Jul. 25, 2023

(54) SCREEN SHOOTING RANGE AND METHOD OF PLAYING SCREEN SHOOTING GAME USING ARTIFICIAL INTELLIGENCE TECHNOLOGY

(71) Applicant: NSPARK INC., Seoul (KR)

(72) Inventor: No Sun Park, Seoul (KR)

(73) Assignee: NSPARK Inc., Seoul (KR)

( * ) Notice: Subject to any disclaimer, the term of this patent is extended or adjusted under 35 U.S.C. 154(b) by 60 days.

(21) Appl. No.: 17/354,242

(22) Filed: Jun. 22, 2021

(65) Prior Publication Data
US 2021/0394045 A1 Dec. 23, 2021

(30) Foreign Application Priority Data
Jun. 23, 2020 (KR) .................. 10-2020-0076557

(51) Int. Cl.
*A63F 13/219* (2014.01)
*A63F 13/837* (2014.01)
*A63F 9/02* (2006.01)
*A63F 13/213* (2014.01)
*A63F 13/235* (2014.01)
(Continued)

(52) U.S. Cl.
CPC .......... *A63F 9/0291* (2013.01); *A63F 13/213* (2014.09); *A63F 13/219* (2014.09); *A63F 13/235* (2014.09); *A63F 13/27* (2014.09); *A63F 13/285* (2014.09); *A63F 13/428* (2014.09); *A63F 13/837* (2014.09); *G06N 20/00* (2019.01); *A63F 2300/8023* (2013.01); *A63F 2300/8076* (2013.01)

(58) Field of Classification Search
None
See application file for complete search history.

(56) References Cited

U.S. PATENT DOCUMENTS 7,413,514 B2 * 8/2008 Saikawa ................. G06T 15/20
463/46
2012/0142415 A1 * 6/2012 Lindsay ............... G06T 19/006
463/33
(Continued)

FOREIGN PATENT DOCUMENTS

KR 10-1074670 10/2011
KR 20-0462198 8/2012
(Continued)

*Primary Examiner* — Damon J Pierce
(74) *Attorney, Agent, or Firm* — Fish & Richardson P.C.

(57) ABSTRACT

The present invention provides a screen shooting range and a method of playing a screen shooting game using artificial intelligence technologies. The screen shooting range includes a set studio including a plurality of shooting spaces virtually divided so as to continue a movement line of a user, wherein each of the divided shooting spaces is decorated according to different themes; a plurality of structures disposed in the shooting spaces; a sensor unit configured to detect a motion or position of the user; a plurality of image display units disposed in the shooting space to display images; a moving means provided so that the structure or the image display unit can be moved; a main server for storing a plurality of images as a manual and receiving position information of the laser point; and a controller for controlling internal configurations of the shooting space as a whole.

1 Claim, 19 Drawing Sheets

(51) Int. Cl.
*A63F 13/27* (2014.01)
*A63F 13/285* (2014.01)
*A63F 13/428* (2014.01)
*G06N 20/00* (2019.01)

(56) References Cited

U.S. PATENT DOCUMENTS

2018/0202775 A1* 7/2018 Ghani .................. F41J 5/14
2020/0368616 A1* 11/2020 Delamont ............ A63F 13/213

FOREIGN PATENT DOCUMENTS

KR 10-1642956 7/2016
KR 10-1689330 12/2016

* cited by examiner

SCREEN SHOOTING RANGE AND METHOD OF PLAYING SCREEN SHOOTING GAME USING ARTIFICIAL INTELLIGENCE TECHNOLOGY

RELATED APPLICATIONS

This application claims priority to Korean Patent Application No. 10-2020-0076557, filed on Jun. 23, 2020 in the Korean Intellectual Property Office, the entire disclosure of which is incorporated herein by reference.

BACKGROUND OF THE INVENTION

1. Field of the Invention

The present invention relates to a screen shooting range and a method of playing a screen shooting game using artificial intelligence technologies.

2. Description of the Related Art

Recently, with the progress of multimedia technology and computer programming technology, virtual experiences, which have the same feeling as in real situations within a virtual space that simulates the real situations, and create situations which are difficult to implement in the real situations, are becoming popular.

In particular, aircraft training, indoor driving practice, and the like are performed within a virtual space simulated to be identical to the real situation, and in the sports field, training of athletes is performed in the virtual space, thereby it is possible to train based on accurate data.

Further, in the game field or exercise field, due to the virtual experience, a situation that cannot be created in the real situation may be experienced through multimedia and computer technologies.

As such, virtual reality education using a simulator allows users to experience situations which are difficult to directly create in real situations, such that it is often used to cultivate abilities to properly respond to the case of occurring the real situation.

Recently, in addition to the virtual reality experiences, indoor screen game devices, which allow the users to enjoy various exercises and games indoors through a screen almost similar to the real situations in relation to the simulator without going to the actual field for exercise or games, have been developed. Examples of these indoor screen games may include an indoor screen golf game, a screen baseball game, a screen dance game, a screen shooting game and the like.

Among them, in the indoor screen shooting game device, a game is played by shooting a target displayed on a screen, for example, in a way of firing a light bullet such as an infrared laser beam or detecting an image of a specific point displayed on the screen. In such a screen shooting game device, the game is played by a single user or a plurality of users using given game guns at designated positions facing the screen.

Korean Patent Registration No. 10-1816994 (Published on Jan. 1, 2018, Hereinafter, referred to as Patent Document 1) relates to a screen shooting system including a difficulty selection device which allows a user to directly set the game difficulty and control competition and score acquisition by him or herself through differential scoring of scores.

However, Patent Document 1 discloses a two-dimensional screen shooting game in which a user shoots a target by putting a gun held by the user to the screen and pulling the trigger, but there are problems in that it cannot give satisfaction to users who prefer more dynamic motions like real battles, since it is difficult for the users to move around the screen and they have no choice but to look at the screen.

PRIOR ART DOCUMENT

Patent Document (Patent Document 1) Korean Patent Registration No. 10-1816994

SUMMARY OF THE INVENTION

In consideration of the above-mentioned circumstances, it is an object of the present invention to provide a screen shooting range and a method of playing a screen shooting game using artificial intelligence technologies, which allow users to enjoy a three-dimensional and complex shooting game through motions like real battles using various structures and a plurality of screens, departing from a two-dimensional game where the users only look at one screen and play a shooting game.

Another object of the present invention is to provide a screen shooting range and a method of playing a screen shooting game using artificial intelligence technologies, in which a target object appears along with motions of various structures, thereby allowing users to enjoy a more realistic shooting game.

In addition, another object of the present invention is to provide a screen shooting range and a method of playing a screen shooting game using artificial intelligence technologies, which allow users to enjoy various shooting games by forming shooting spaces according to various themes by selections of the users.

Further, another object of the present invention is to provide a screen shooting range and a method of playing a screen shooting game using artificial intelligence technologies, which do not require washing unlike a survival game that requires washing of equipment once used.

To achieve the above-described objects, according to an aspect of the present invention, there is provided a screen shooting range using artificial intelligence technologies including: a set studio including a plurality of shooting spaces which are virtually divided so as to continue a movement line of a user and are configured to allow the user to shoot a target object, wherein each of the divided shooting spaces is decorated according to different themes; a plurality of structures which are disposed in the shooting spaces and configured to allow the user to be concealed and covered, and are different types of articles; a sensor unit configured to detect a motion or position of the user; a plurality of image display units which are disposed at predetermined positions in the shooting space, and are configured to be moved and relocated in the shooting space and display an image corresponding to the motion of the user detected by the sensor unit; a moving means provided so that at least a part of the structure or the image display unit is moved; a main server configured to store a plurality of images corresponding to the motion or position of the user detected by the sensor unit as a manual; and a controller configured to control the position and motion of the structure according to the motion of the user, transmit information detected by the sensor unit to the main server, send the image stored in the main server to the image display unit for displaying the image according to the manual, and control internal configurations of the shooting space as a whole.

The screen shooting range according to an embodiment of the present invention may further include a wireless gun held by the user and equipped with an infrared laser to form a laser point according to the user's intention.

In the screen shooting range according to an embodiment of the present invention, the wireless gun may further include a recoil inducing means using air pressure so as to allow the user to feel recoil when firing.

In the screen shooting range according to an embodiment of the present invention, the recoil inducing means may include an air compressor or a lithium-ion battery.

The screen shooting range according to an embodiment of the present invention may further include a laser recognition camera configured to detect the laser point aimed by the wireless gun.

In the screen shooting range according to an embodiment of the present invention, the main server may receive position information of the laser point detected by the laser recognition camera.

In the screen shooting range according to an embodiment of the present invention, the image display unit may include: a beam projector configured to transmit the image received from the main server; and a screen on which the image transmitted from the beam projector is projected.

In the screen shooting range according to an embodiment of the present invention, the laser recognition camera may be disposed toward the screen, and if the user pulls the trigger of the wireless gun when aiming toward the screen, a laser beam may be emitted to the screen to form a laser point.

In the screen shooting range according to an embodiment of the present invention, wherein as the screen is moved by the moving means, the beam projector and the laser recognition camera may be moved or changed in directions toward the screen.

In the screen shooting range according to an embodiment of the present invention, the sensor unit may include: a beacon sensor disposed on a ceiling of the shooting space to detect a position, motion and movement of the user; a height detection sensor disposed in the shooting space to photograph and detect a height of the user; and an optical sensor configured to detect an action of user.

In the screen shooting range according to an embodiment of the present invention, when the position, motion and movement of the user are detected by the beacon sensor, the controller may send a command to the image display unit to project an image in which the motion of the target object stored in the main server is produced.

In the screen shooting range according to an embodiment of the present invention, the projected image may include contents in which the target object is aimed at the user in response to the motion of the user, or the user is concealed or covered through the structure, or escapes.

To achieve the above-described objects, according to another aspect of the present invention, there is provided a method of playing a screen shooting game using artificial intelligence technologies including: a first step of receiving, by a controller, user information input by a user before entering a shooting space; a second step of providing, by the controller, a plurality of shooting game menus to the user together with information on each shooting game; a third step of causing, by the controller, the user to select the number of users to be played, select any one of the plurality of provided shooting game menus, and select a difficulty level of the selected shooting game from high, medium and low; a fourth step of performing, by the controller, a first setting to set internal configurations of the shooting space by selecting a type, a position and a height of a structure which allows the user to be concealed and covered according to the manual stored in the main server in response to the shooting game and difficulty selected by the user, selecting an image projected by an image display unit, selecting positions of the structure and the image display unit in advance, and selecting a position of a laser recognition camera according to the position of the image display unit; a fifth step of causing, by the controller, the user to hold a wireless gun and enter the shooting space, thus to start the shooting game; a sixth step of performing, by the controller, a second setting to change the internal configurations of the shooting space by moving the structure, the laser recognition camera and the image display unit to predetermined positions according to the motion or position of the user during when the user plays the shooting game; a seventh step of causing, by the controller, the user to exit the shooting space when the shooting game is finished; and an eighth step of calculating, by the controller, shooting game results and storing the calculated shooting game results and shooting game contents in a main server.

According to the present invention, the user may enjoy a three-dimensional and complex shooting game through motions like real battles using various structures and a plurality of screens, departing from a two-dimensional game where the users only look at one screen and play a shooting game, and enjoy a more realistic shooting game, since the target object appears along with motions of various structures.

In addition, according to the present invention, shooting spaces according to various themes may be formed according to the selection of the user, such that it is possible to enjoy various shooting games.

Further, according to the present invention, there is no need to wash equipment unlike the survival game that requires washing of equipment once used, and there is no need to wear equipment such as various types of survival games, whereby it is convenient to manage game equipment.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
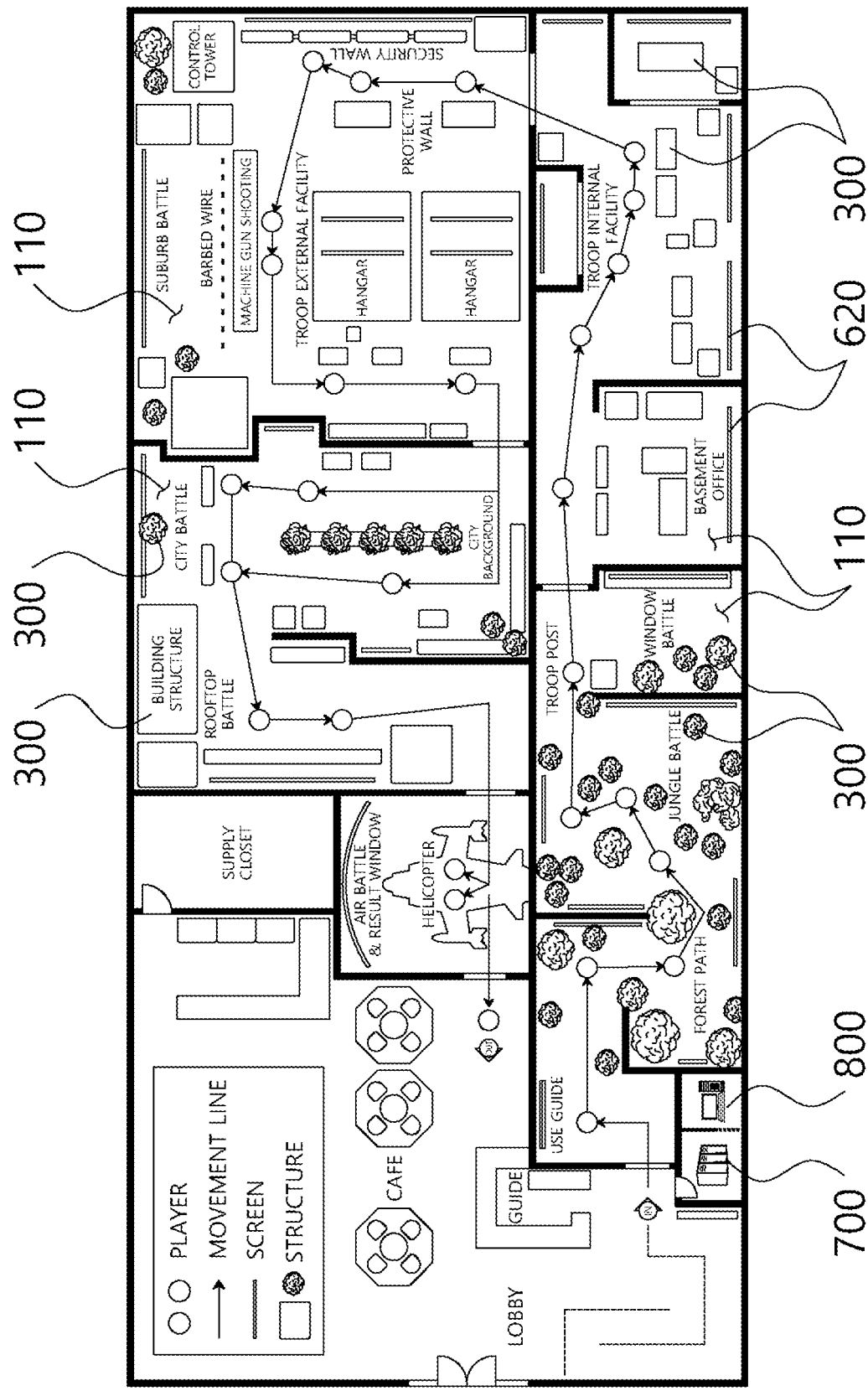
FIG. 1 is a plan view schematically illustrating an embodiment of a screen shooting range using artificial intelligence technologies according to the present invention.

Hereinafter, embodiments will be described in detail with reference to the accompanying drawings. In denoting reference numerals to constitutional elements of respective drawings, it should be noted that the same elements will be denoted by the same reference numerals although they are illustrated in different drawings. Further, in description of preferred embodiments of the present invention, the publicly known functions and configurations related to the present invention, which are judged to be able to make the purport of the present invention unnecessarily obscure will not be described in detail.

In addition, in describing components of the present invention, the terms first, second, A, B, (a), (b), and the like, may be used. These terms are intended to distinguish the components from other components, and do not limit the nature, sequence or order of the components. It will be understood that when a component is described to as being "connected", "combined" or "coupled" to another component, the component may be directly connected or coupled the another component, but it can be "connected", "combined" or "coupled" to the another component intervening another component may be present.

Hereinafter, a screen shooting range using artificial intelligence technologies according to an embodiment of the present invention will be described with reference to the accompanying drawings.

Figure 2:
FIG. 2 is a view illustrating a state of looking at a target object with a scope of a sniper rifle among wireless guns of the screen shooting range using artificial intelligence technologies according to an embodiment of the present invention.
Figure 3:
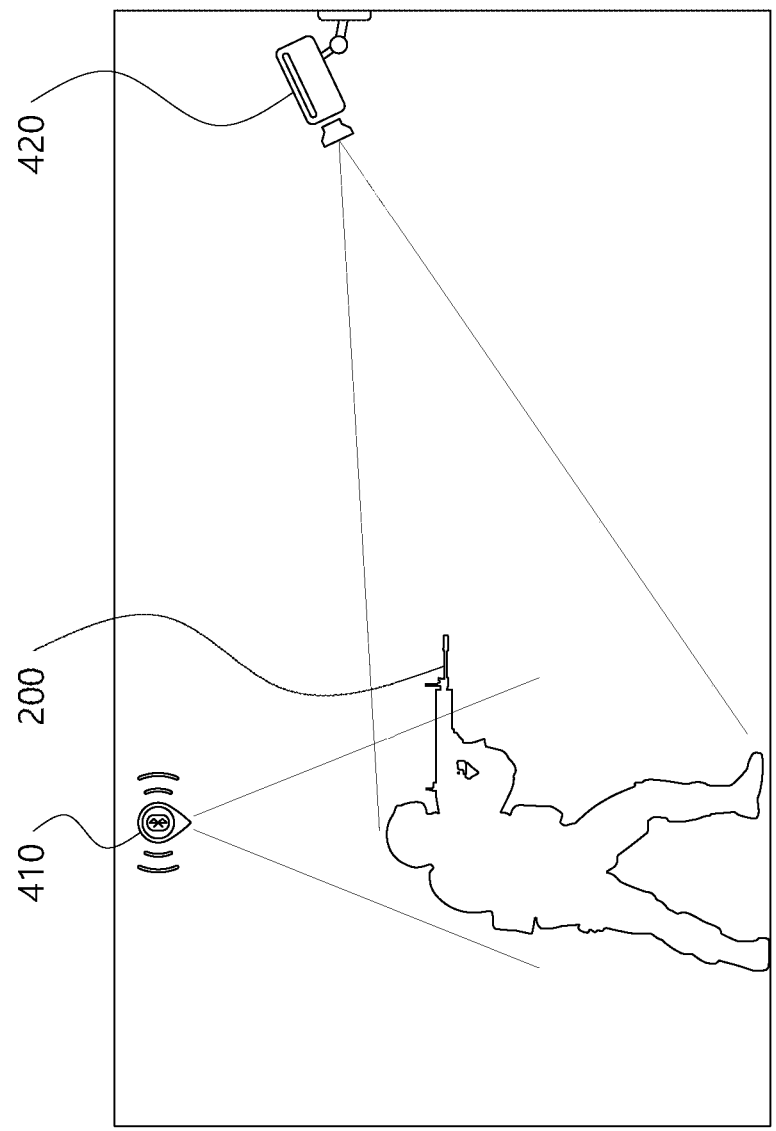
FIGS. 3 and 4 are schematic diagrams illustrating a sensor unit of the screen shooting range using artificial intelligence technologies according to an embodiment of the present invention.
Figure 4:
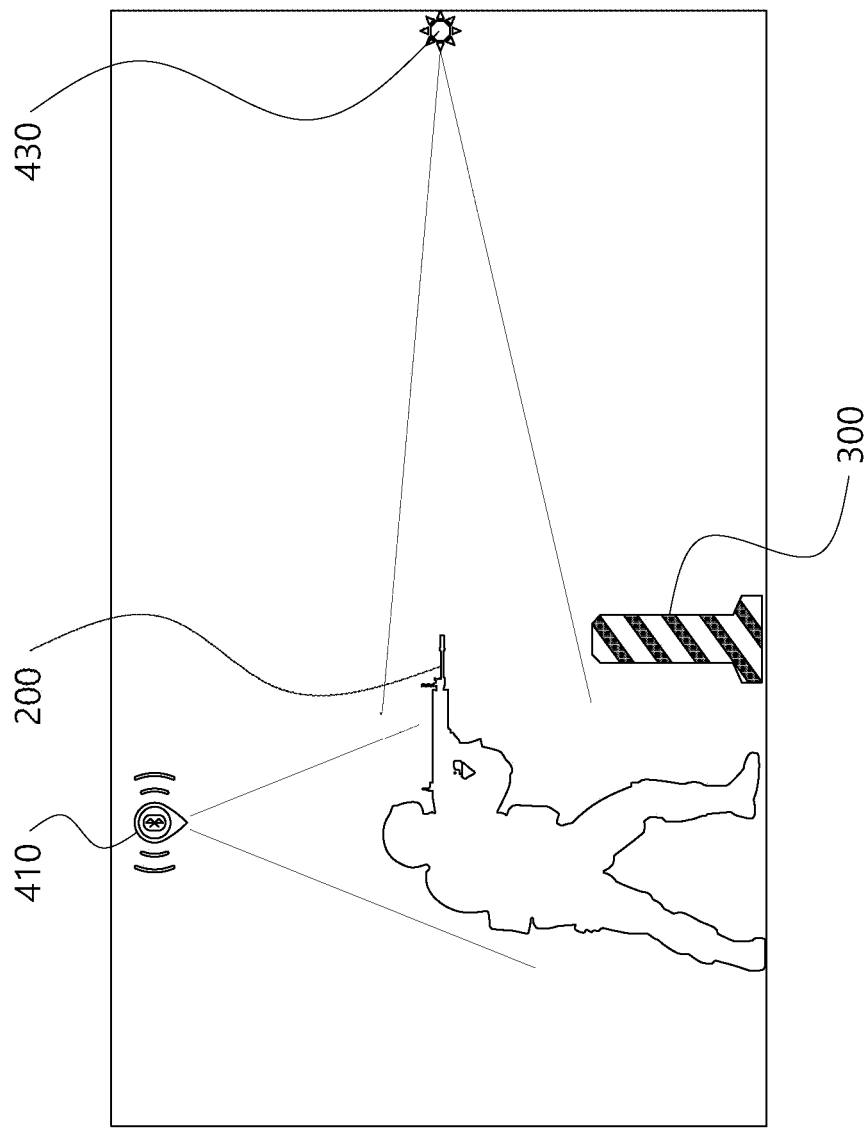
Figure 5:
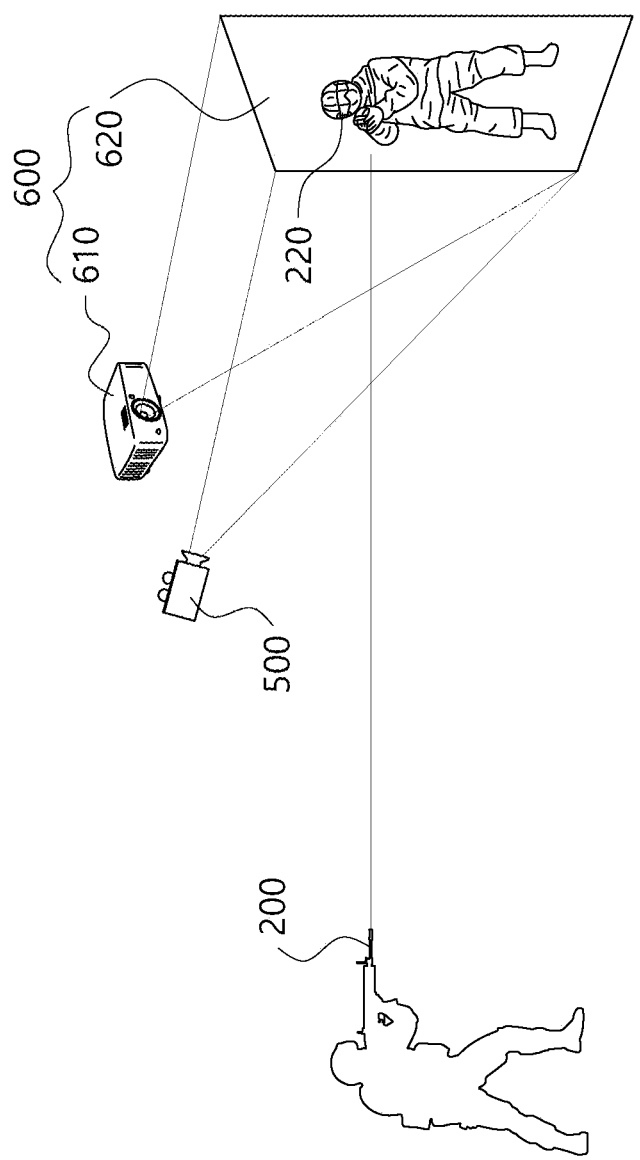
FIG. 5 is a schematic diagram illustrating an image display unit of the screen shooting range using artificial intelligence technologies according to an embodiment of the present invention.
Figure 6:
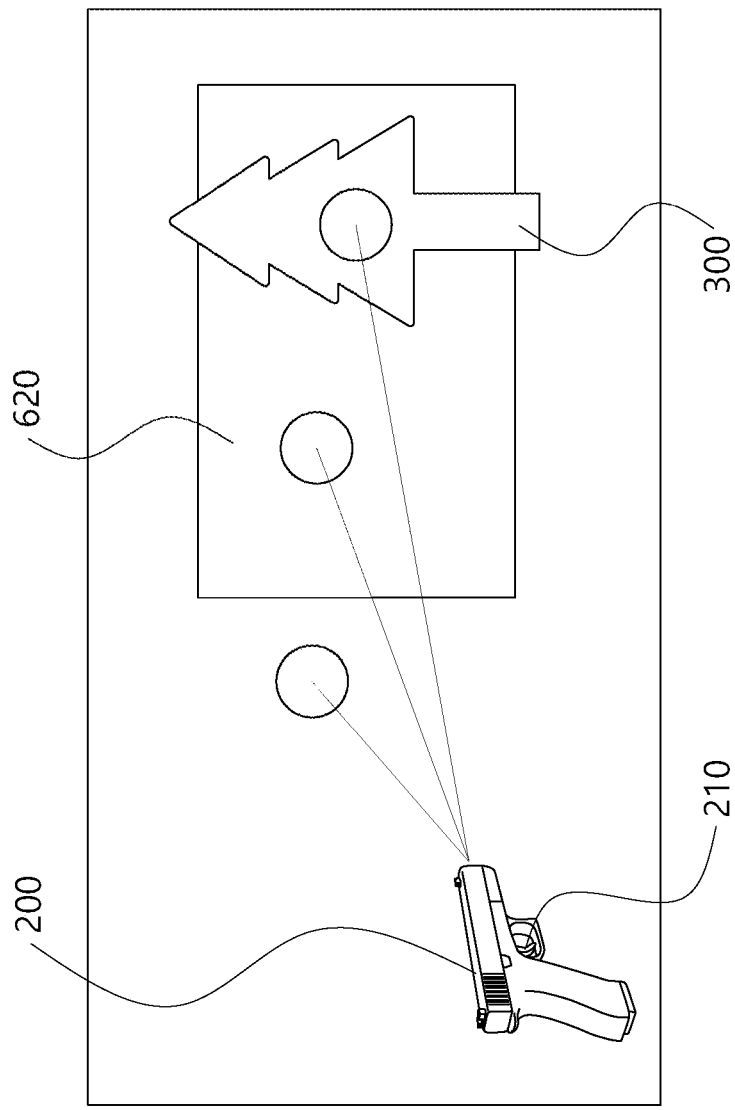
FIG. 6 is a schematic diagram illustrating a wireless gun and laser points on a screen of the screen shooting range using artificial intelligence technologies according to an embodiment of the present invention.
Figure 7:
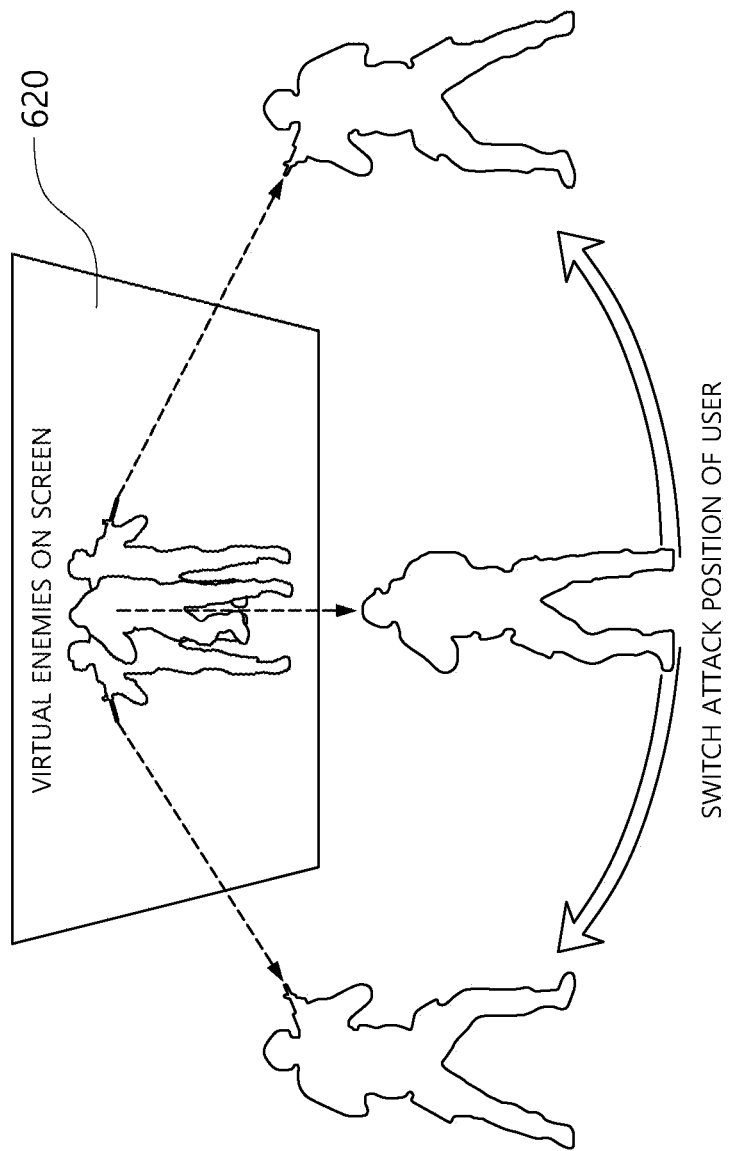
FIG. 7 is a diagram illustrating a state in which motions of target objects are changed according to a motion of a user in the screen shooting range using artificial intelligence technologies according to an embodiment of the present invention.
Figure 8:
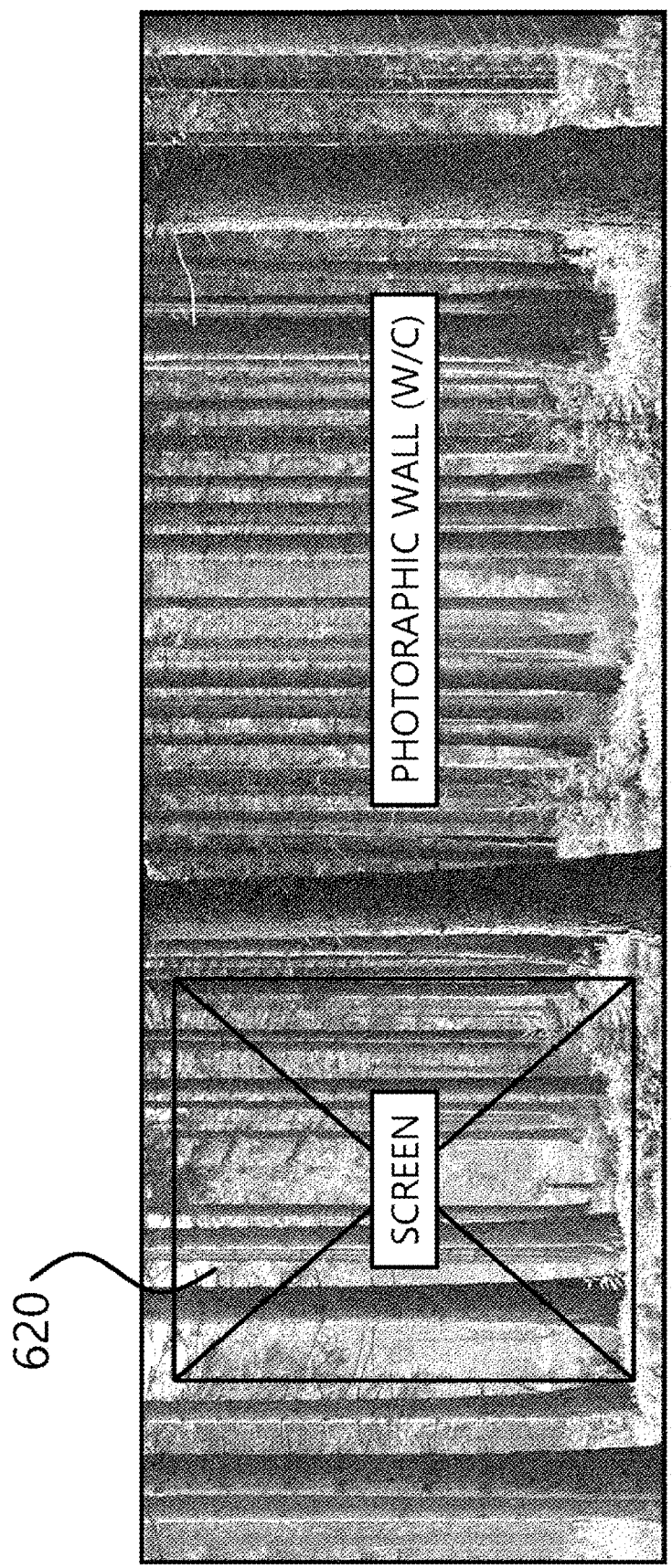
FIGS. 8 to 17 are diagrams respectively illustrating a part of an image projected on the screen of the screen shooting range using artificial intelligence technologies according to an embodiment of the present invention.
Figure 9:
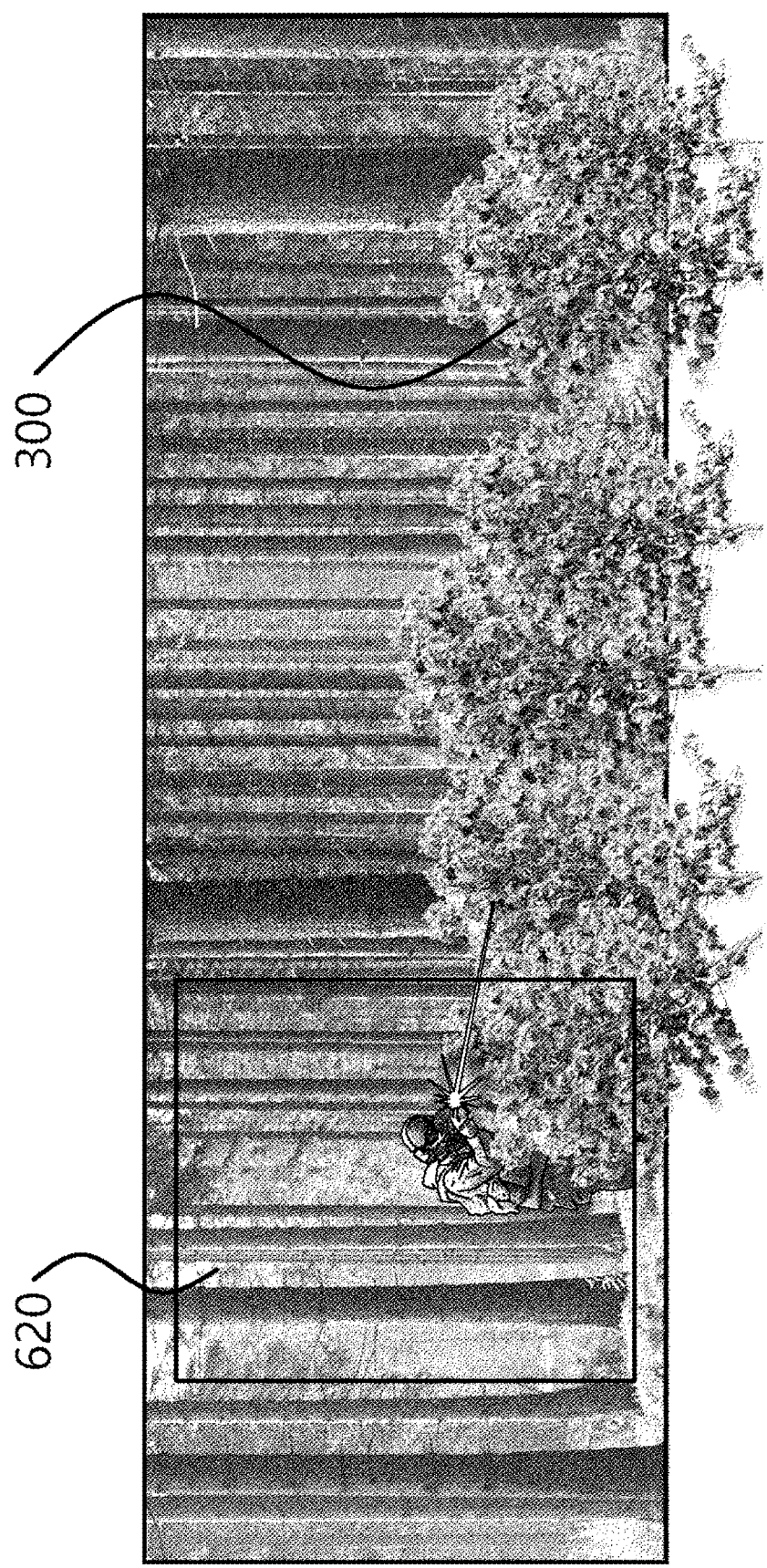
Figure 16:
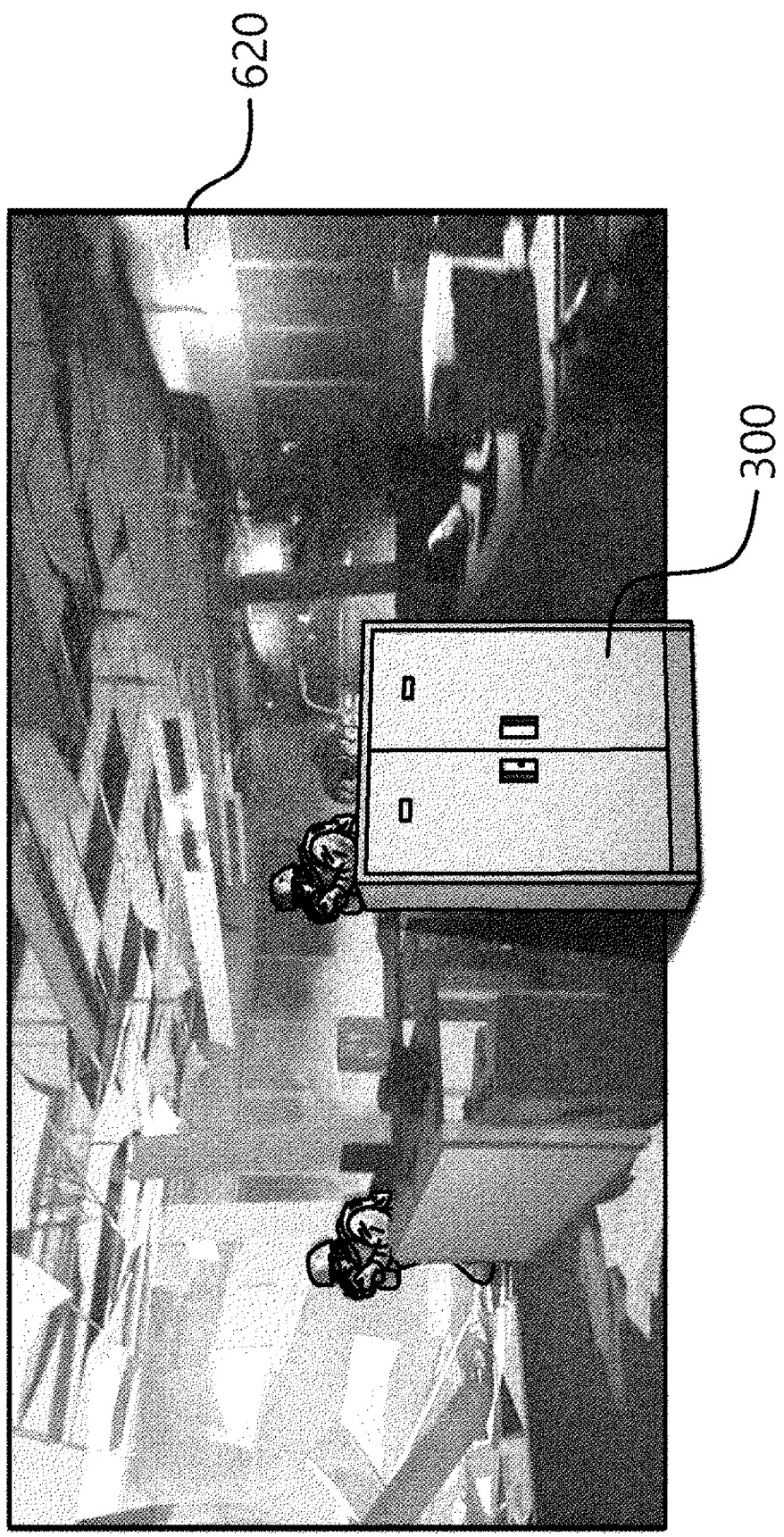
Figure 17:
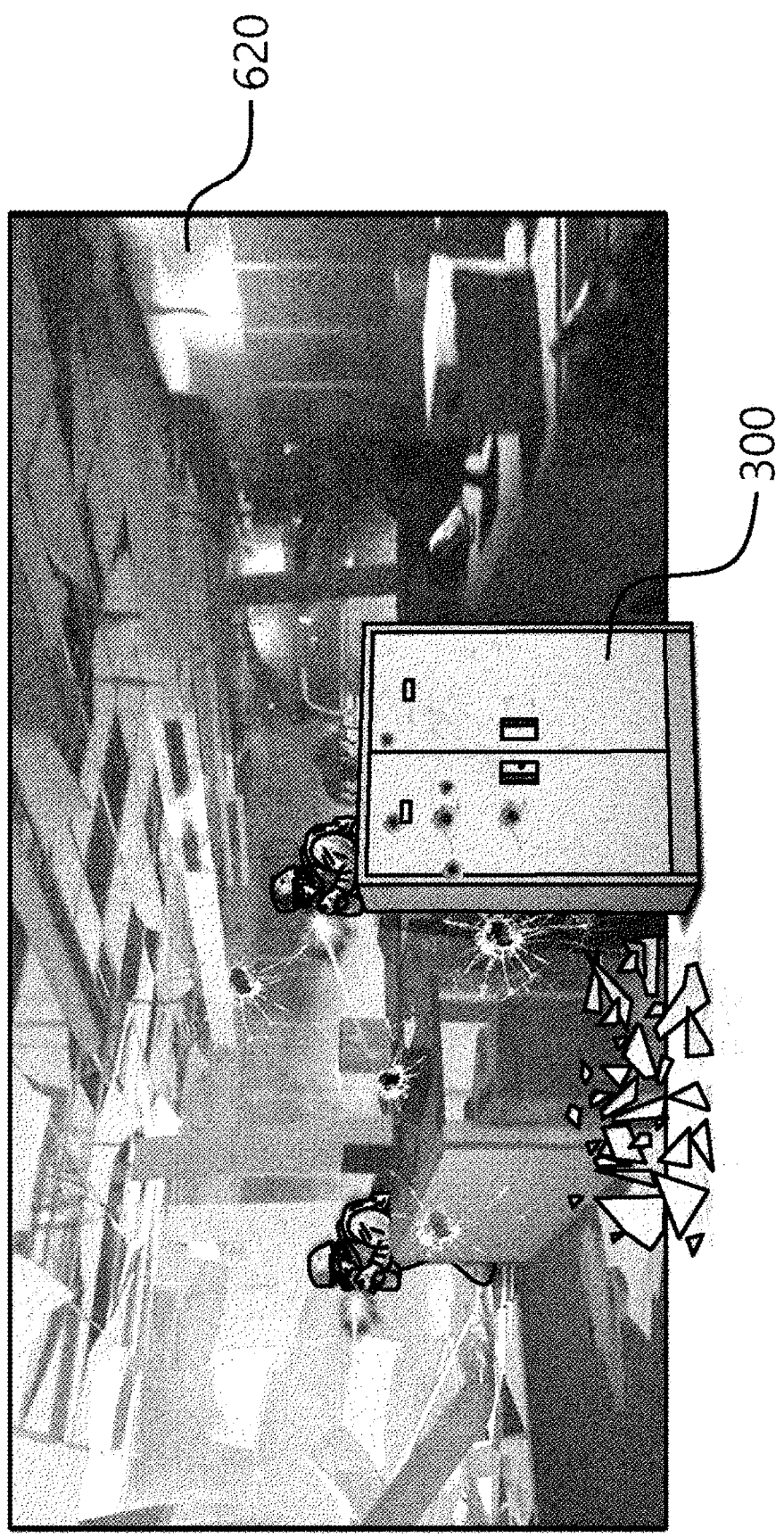
Figure 18:
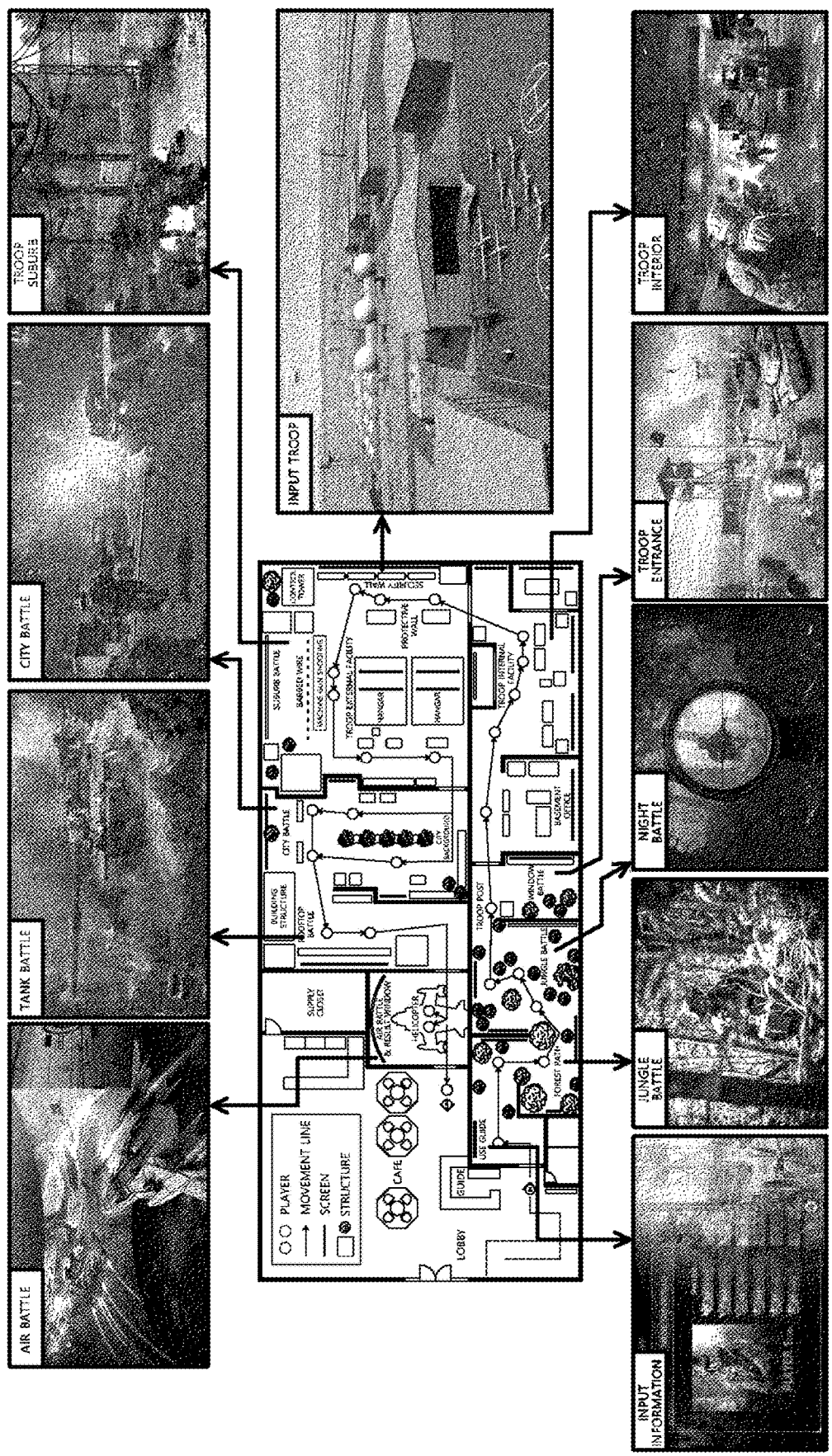
FIG. 18 is a diagram illustrating an example of an image which may be projected in each divided shooting space in the screen shooting range using artificial intelligence technologies according to an embodiment of the present invention.
Figure 19:
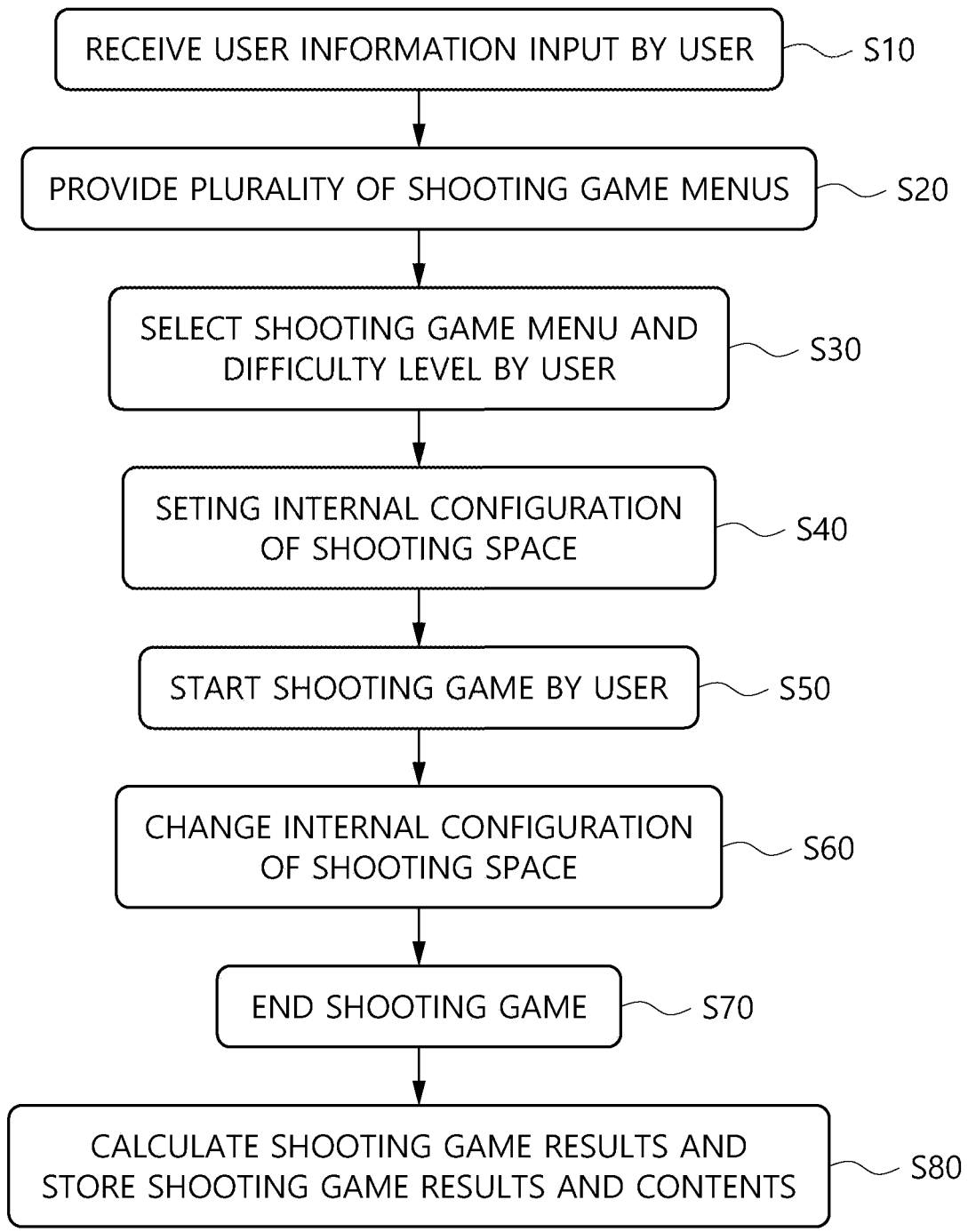
FIG. 19 is a flowchart illustrating a method of playing a screen shooting game using artificial intelligence technologies according to an embodiment of the present invention.

FIG. 1 is a plan view schematically illustrating an embodiment of a screen shooting range according to the present invention, FIG. 2 is a view illustrating a state of looking at a target object with a scope of a sniper rifle among wireless guns of the screen shooting range according to an embodiment of the present invention, FIGS. 3 and 4 are schematic diagrams illustrating a sensor unit of the screen shooting range according to an embodiment of the present invention, FIG. 5 is a schematic diagram illustrating an image display unit of the screen shooting range according to an embodiment of the present invention, FIG. 6 is a schematic diagram illustrating a wireless gun and laser points on a screen of the screen shooting range according to an embodiment of the present invention, FIG. 7 is a diagram illustrating a state in which motions of target objects are changed according to a motion of a user in the screen shooting range according to an embodiment of the present invention, FIGS. 8 to 17 are diagrams respectively illustrating a part of an image projected on the screen of the screen shooting range according to an embodiment of the present invention, FIG. 18 is a diagram illustrating an example of an image which may be projected in each divided shooting space in the screen shooting range according to an embodiment of the present invention, and FIG. 19 is a flowchart illustrating a method of playing a screen shooting game according to an embodiment of the present invention.

Referring to FIGS. 1 to 16, the screen shooting range using artificial intelligence technologies according to an embodiment of the present invention may include a set studio 100, wireless guns 200, structures 300, a sensor unit 400, laser recognition cameras 500, image display units 600, a moving means (not shown), a main server 700 and a controller 800.

The set studio 100 may be divided into a plurality of spaces. Each space is a space where a user shoots while playing a game, and will be referred to as a shooting space 110 below. In other words, the set studio 100 may include a plurality of shooting spaces 110.

In this case, the plurality of shooting spaces 110 may be divided so that a movement line L continues between the spaces when the user moves from one shooting space 110 to another shooting space 110 adjacent thereto. That is, it is preferable that adjacent shooting spaces have only a partial wall formed or a door or window installed therein to allow the user to move through each space. For example, each shooting space 110 is exemplarily illustrated so that the movement line L of the user continues in FIG. 1.

In addition, it is preferable that each of the plurality of shooting spaces 110 is decorated according to different themes. As shown in FIG. 1, the shooting space 110 may be decorated with trails, forests, basement offices, hangars, downtowns, etc. by a manufacturer, and in addition to the above-mentioned places, the shooting space 110 may have a wide variety of themes that can be imagined and applied by the manufacturer and user.

The user may grip and use the wireless gun 200. In a conventional arcade, game room, or conventional screen shooting range, guns (not shown) operated through a wire are used to accurately shoot the target object of the screen or display device and discourage theft, but there are limitations on the motion and movement of the user to use in the set studio for an experience as close to the real battle as possible, like the present invention. Accordingly, the wireless gun 200 is intended to enhance such mobility, and is not limited to any one such as Bluetooth or short-range wireless communication technologies, and any method can be used as long as it can wirelessly connect the main server 700 and the wireless gun 200.

The wireless gun 200 is not limited to any specific type. For example, various models such as automatic rifles and pistols may be used. As an example, referring to FIG. 2, the user may use a sniper gun (not shown) equipped with a sniper lens (not shown), and the user may look at the target object with the sniper lens (not shown) of the sniper rifle (not shown). In this case, an enlarged state of the target object in a shape of a magnifying glass having a predetermined size may appear on a screen 620.

The wireless gun 200 may be equipped with an infrared laser (not shown). That is, the wireless gun 200 may form a laser point 220 on the screen 620 to be described below by pulling a trigger 210 according to user's intention.

In addition, the infrared laser of the wireless gun 200 may be operated by using a lithium-ion battery.

The wireless gun 200 may further include a recoil inducing means (not shown). In one embodiment of the present invention, the recoil inducing means is provided in the wireless gun 200 for an experience like real battle, and when the user pulls the trigger 210, the user may feel recoil by an operation of the recoil inducing means. In this case, as the recoil inducing means, an air pressure such as a high pressure air (HPA) may be used, and the lithium-ion battery or an air compressor may also be used.

A plurality of structures 300 may be disposed in the plurality of shooting spaces 110. The plurality of structures 300 allow the user to be concealed or covered and may be different types of articles. In this case, the plurality of structures 300 may be articles corresponding to the theme of the shooting space 110 according to the selection of the user. For example, when the shooting space 110 is decorated in a forest, trees and rocks may be used as the structure 300, and in the case of an office, a desk, a chair, a cabinet, and the like may be used as the structure 300.

A position of the structure 300 may be changed by a moving means (not shown) to be described below. If the user selects the type and difficulty of a shooting game before starting the shooting game, the structure 300 may be moved to a position corresponding to the selected shooting game by the moving means. In addition, the structure 300 may be moved by the moving means so as to match with an image projected on the screen 620 to be described below even during playing the game.

In this case, although not shown in the drawings, a rail (not shown) having a predetermined shape is provided in the set studio 100, and the structure 300 is provided wheels (not shown) disposed on the rail, such that the structure 300 may move along the rail. In addition, one end of a wire (not shown) is connected to the structure 300, and the other end of the wire is wound by a predetermined number of times on pulleys (not shown), such that a height of the structure 300 can be adjusted, and a rail (not shown) is provided on the ceiling of the set studio 100 and pulleys may move along the rail. In addition, it is also possible to move the structure 300 to a position using a servo motor provided in the set studio 100 and then return it to its original position. That is, the moving means of the structure 300 is not particularly limited to any one, and any moving means may be used as long as it allows the structure 300 to move without interfere with the user.

Referring to FIGS. 3 and 4, the sensor unit 400 may include a beacon sensor 410, a height detection sensor 420 and an optical sensor 430. The beacon sensor 410, the height detection sensor 420, and the optical sensor 430 are not arranged one by one in any one shooting space 110, but a plurality of sensors may be arranged.

The beacon sensor 410 may be disposed on the ceiling of the set studio 100, that is, the ceiling of the shooting space 110 to detect the position, motion and movement of the user.

The height detection sensor 420 is disposed on a wall of the set studio 100, that is, the wall of the shooting space 110, to photograph and detect the height of the user. That is, the motion of the user may be detected using the structure 300 that allows the user to be concealed or covered. In other words, when the user stands up in a state in which the body is covered by the structure 300 or releases the concealed or covered state, the height detection sensor 420 may detect the changed height of the user to determine the appearance.

The optical sensor 430 may be disposed on the wall of the set studio 100, that is, the wall of the shooting space 110 to detect an action of the user.

When the position, motion and movement of the user are detected by the beacon sensor 410, as will be described below, the controller 800 may send a command by an electrical signal to the image display unit 600 to project an image in which the motion of the target object stored in the main server 700 is produced. For reference, the controller 800 may send a command by an electrical signal through an inlet/outlet (I/O) board.

Referring to FIG. 5, the screen shooting range according to an embodiment of the present invention may include the laser recognition camera 500.

The laser recognition camera 500 may detect whether the user has fired the wireless gun 200 by recognizing the laser point 220.

Referring to FIGS. 5 and 6, the laser recognition camera 500 is preferably installed on the ceiling of the shooting space 110, and may be disposed toward the screen 620 to be described below. If the user pulls the trigger of the wireless gun 200 when aiming toward the screen 620, a laser beam is emitted to the screen 620 to form the laser point 220. In this case, the laser recognition camera 500 may photograph or recognize the laser point 220. For reference, a range in which the laser point 220 can be recognized is not limited to the screen 620, and it is preferable that the laser point 220 generated outside the screen 620 is recognized.

When the user pulls the trigger 210 of the wireless gun 200 to shoot the bullet, the laser point 220 is formed on the outside of the screen 620, and if the laser point 220 is detected by the laser recognition camera 500, the controller 800 to be described below recognizes it as a misfire, and it may be determined that the remaining bullets inside the wireless gun 200 have been decreased. For reference, it is also possible for the user to generate a firing signal by pulling the trigger 210, such that the bullet of the wireless gun 200 is subtracted by the controller 800.

In addition, the image display unit 600 to be described below may display a scene in which an object such as a tree, a rock, a cabinet, and the like formed of the structure 300 is hit by the bullet rather than the target object due to the misfire. In this case, the object may be a public person.

The image display unit 600 may be disposed at a predetermined position in the shooting space 110. The image display unit 600 may display an image corresponding to the motion of the user. The image display unit 600 may include a beam projector 610 and the screen 620. Only one image display unit 600 is not present in one shooting space 110, but a plurality of image display units 600 are disposed in one shooting space 110, such that the user may enjoy a more three-dimensional and complex shooting game. In this case, the screen 620 is not limited to any type, but it may be an LED screen.

The beam projector 610 may receive and transmit an image from the main server, which will be described below.

The image transmitted from the beam projector 610 may be projected on the screen 620.

A plurality of image display units 600 may be provided, which may be moved and relocated. That is, the beam projector 610 and the screen 620 may be moved along a predetermined path or may change a viewing direction so as to correspond to the contents of the projected image. In other words, when the screen 620 is moved by the moving means, the beam projector 610 and the laser recognition camera 500 may be moved, or the beam projector 610 and the laser recognition camera 500 may be changed in viewing directions toward the screen 620. In this case, the structure 300 may be moved along with the motion of the image display unit 600.

Referring to FIG. 7, the motion of the user is detected by the beacon sensor 410, the height detection sensor 420 and the optical sensor 430, and thereby the target object projected on the screen 620 may also be moved in response to the motion of the user as will be described below. For example, it is possible to prepare projected images in advance for the motion of the user in various ways, and to project an image corresponding to the motion of the user when the motion of the user is detected.

In addition, referring to FIGS. 8 to 13, in a state in which a photograph or picture is prepared in advance on the wall of the shooting space 110 as a background, an image connected to the photograph or picture may be displayed on the screen 620, or the structure 300 may be additionally installed to further increase a user's immersion in the shooting game.

When the user is detected, the projected image may be changed, such that the target object projected on the screen 620 may be watched and aimed at by the user, and in response thereto, the position of the structure 300 installed around the screen 620 may also be changed.

Figure 10:
Figure 11:

FIGS. 10 and 11 show that the user is detected by the sensor unit 400, such that a dinosaur, which is the target object, in the image projected on the image display unit 600 appears. In this case, due to the appearance of the target object, the structure 300 may be moved and rotated right and left by a predetermined amount, thereby giving a feeling as if the target object is actually approaching the user.

Figure 12:
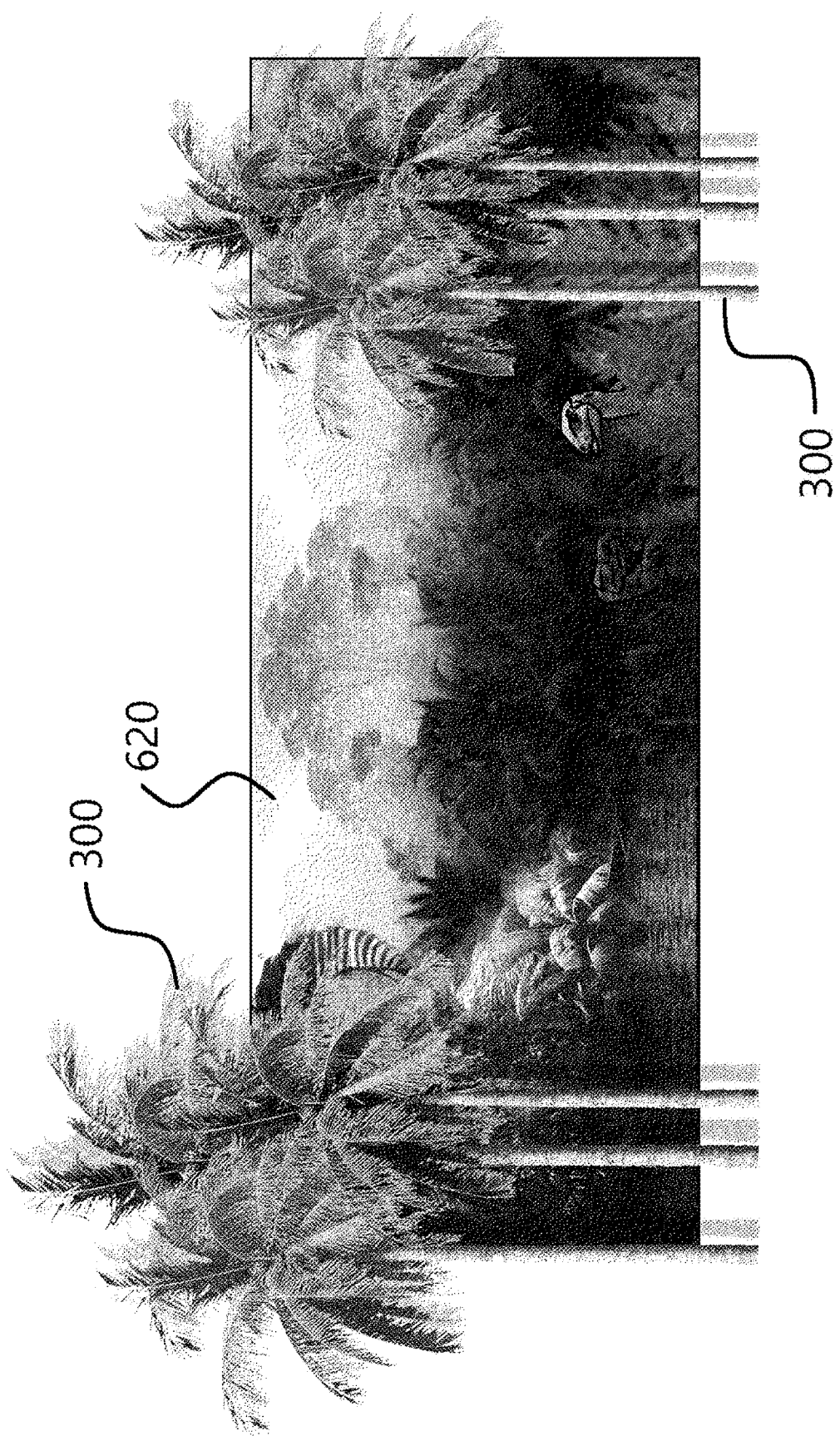
Figure 13:
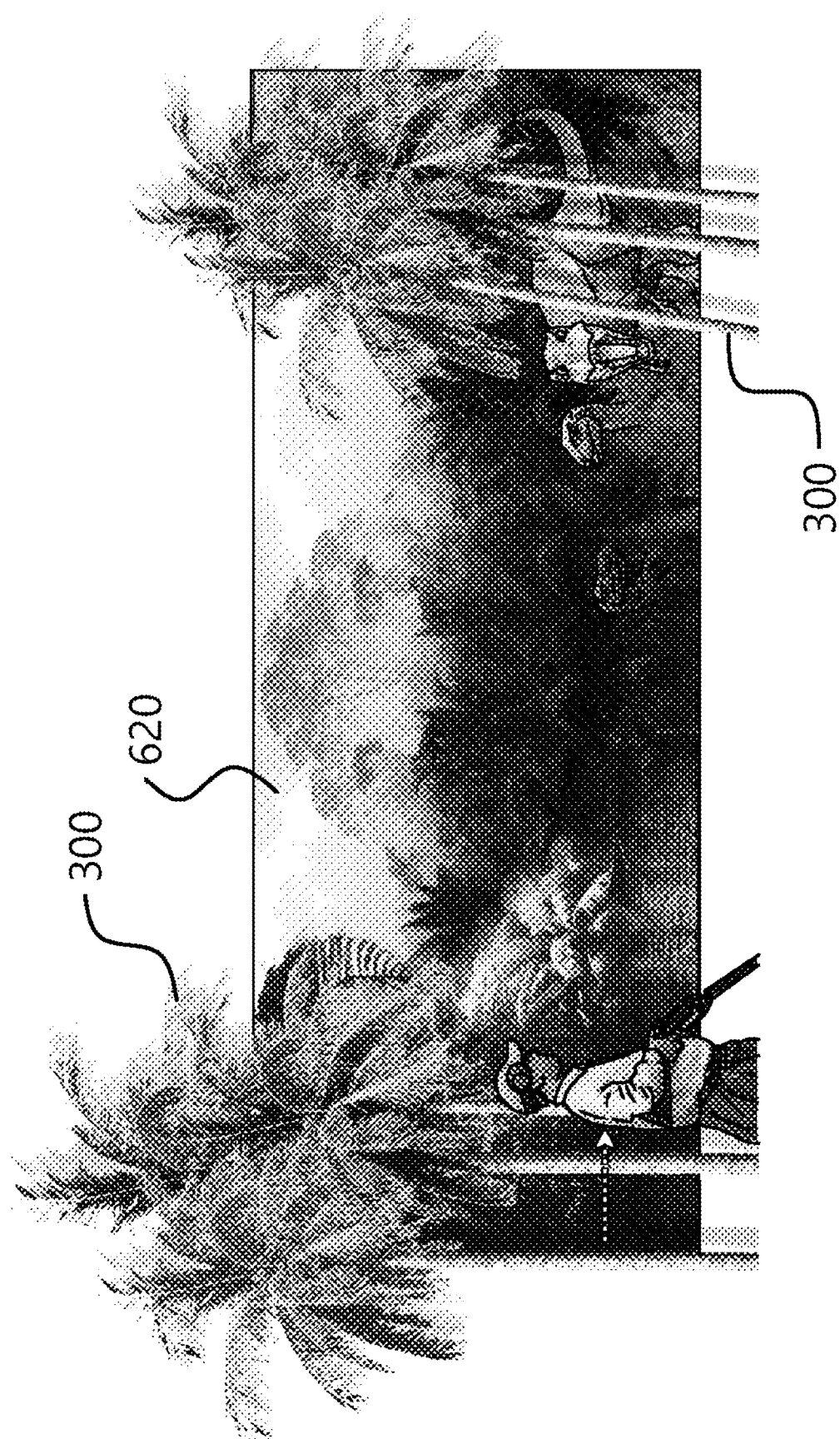

FIGS. 12 and 13 show that the user is detected by the sensor unit 400, such that the target object dinosaur in the image projected on the image display unit 600 is looking toward the user to watch and gaze. In this case, using an effect generated by twisting the body of the target object toward the user, it is possible to produce a figure in which the tree, the structure 300, is tilted and shaken.

Figure 14:
Figure 15:
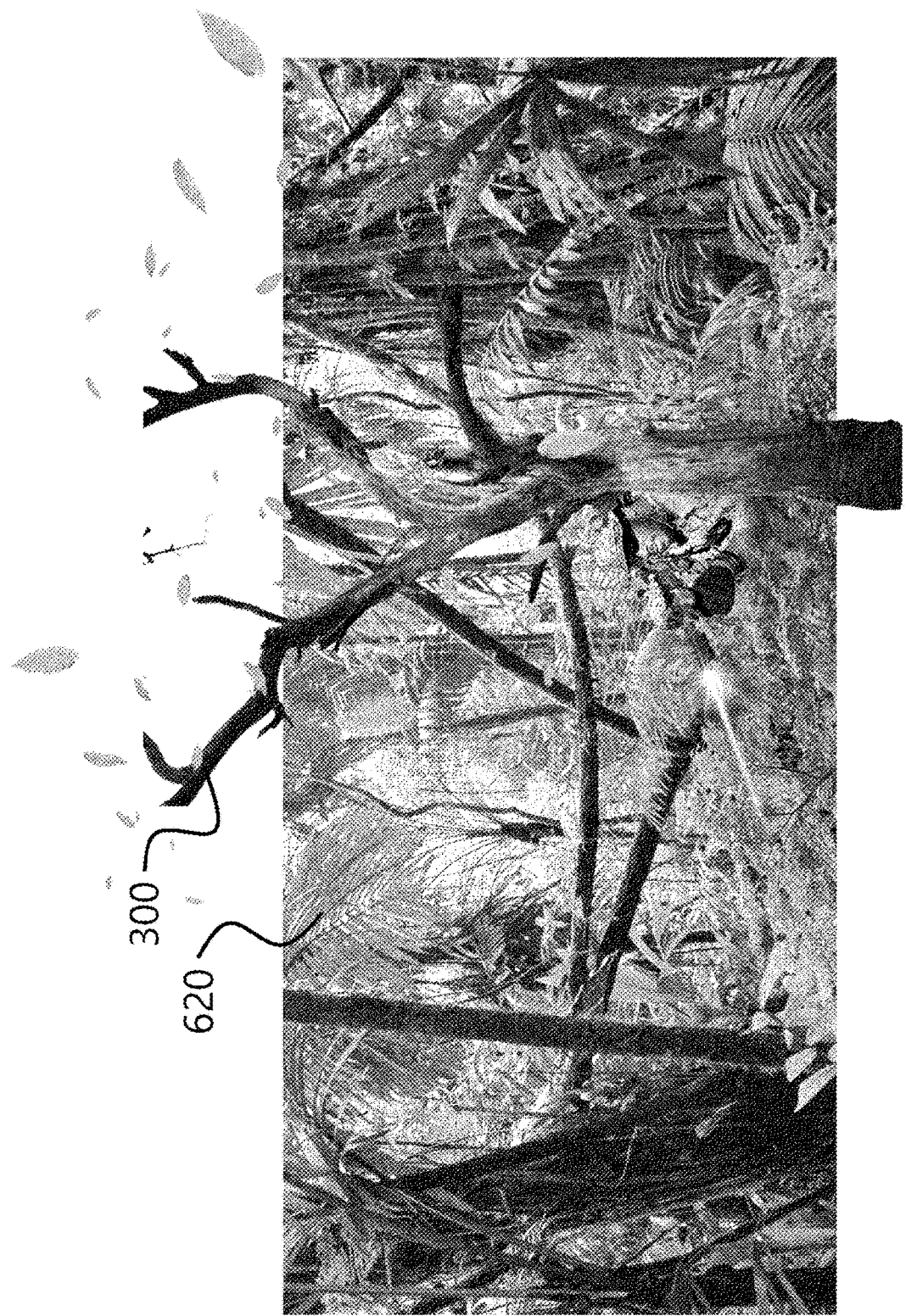

FIGS. 14 and 15 show a figure of battling with the target object. In this case, the target object is performing concealment and cover at positions corresponding to the structure 300. In addition, the structure 300 visually represents an effect of being struck by the bullets by the user. In addition to this, it is possible to add an effect of falling leaves due to impact while bullets are striking the tree of the structure 300.

FIGS. 16 and 17 show a figure of battling with the target object inside a building. In this case, as described above, it may produce a figure in which the cabinet, the structure 300, is struck by the bullets by the shooting of the user. In addition, FIGS. 16 and 17 show a situation in which a battle is fought with a window interposed therebetween, and it may represent a figure in which a bullet fired by the user or target object penetrates a window glass and fragments of the window glass fall to a floor.

In this way, special effects using explosives or booby traps that can be used in movies or dramas may be added to the structure 300, and a battle situation may be created using texture mapping or computer graphics (CGs) on the screen.

When a plurality of screens 620 are arranged in one shooting space 110, the controller 800 sends commands to project different target objects to appear simultaneously on each screen 620, and thereby, the user may have to take a complex action at the same time. If there are two or more users, the plurality of users may each deal with the target objects displayed on the plurality of screens 620.

On the other hand, the projected image may include contents in which the target object is aimed at the user in response to the motion of the user or escapes (see FIGS. 7, 11 and 13).

The main server 700 may manually store a plurality of images corresponding to the motion or position of the user detected by the sensor unit 400. In addition, the main server 700 may receive position information of the laser point 220 detected by the laser recognition camera 500.

Referring to FIGS. 8 to 15, the main server 700 stores a wide variety of images, and before starting a shooting game, various options may be applied according to settings by the user to change the projected image.

The controller 800 may control the position and motion of the structure 300 according to the motion of the user. In addition, information detected by the sensor unit 400 may be transmitted to the main server 700.

The controller 800 may send a command by a signal to transmit the images stored in the main server 700 to the image display unit 600 for displaying the images according to the manual, and may control internal configurations of the shooting space as a whole.

Hereinafter, a method of playing a screen shooting game using artificial intelligence technologies according to an embodiment of the present invention will be described with reference to the accompanying drawings.

FIG. 19 is a flowchart illustrating a method of playing a screen shooting game according to an embodiment of the present invention. Referring to FIG. 19, the method of playing a screen shooting game according to an embodiment of the present invention may include seven steps, for example.

First, a first step (S10) is a step of receiving, by the controller 800, user information input by a user before entering the shooting space 110.

Referring again to FIG. 1, the set studio 100 does not have only the shooting space 110, and may be provided with a space for the user to rest when not in performing the shooting game. That is, the set studio 100 is provided with the resting space, and users taking a break may view an image of a user currently playing the shooting game in the shooting space 110 through a separate screen (not denoted by numerals). In addition, it is also possible for the user to retrieve and examine his or her shooting game play contents stored in the past according to information input by the user. Further, the user may view the image through electronic devices such as a PC or tablet PC, a beam projector and a screen, which are provided in the rest space, and his or her own mobile phone.

A second step S20 is a step of providing, by the controller 800, a plurality of shooting game menus to the user. In this case, types of the provided shooting game menu is not limited, and the manufacturer or the operator of the set studio 100 may selectively change or add the shooting game menu. In addition, it is preferable to provide information on each shooting game together while providing the shooting game menu to the user.

A third step (S30) is a step of causing, by the controller 800, the user to select any one of the plurality of provided shooting game menus. In this case, the controller 800 may cause the user to select a difficulty level of the selected shooting game from high, medium and low, and select a mode corresponding to the number of users to be played.

A fourth step (S40) is a step of performing a first setting to set the inside of the set studio 100 according to the manual stored in the main server 700 depending on the shooting game and difficulty selected by the user in the third step (S30).

In this case, the controller 800 may select the type and position of the structure 300 according to the manual, and may select an image projected by the image display unit 600. In addition, the controller 800 may preset the positions of the structure 300, the laser recognition camera 500, and the image display unit 600 to set the internal configurations of the shooting space 110. For reference, each structure 300, the laser recognition camera 500, and the image display unit

600 may be moved and changed in direction by the moving means (not shown), and the rails, wheels, wires, servo motors, etc. may be used as the moving means.

A fifth step (S50) is a step of causing, by the controller 800, the user to hold the wireless gun 200 and enter the shooting space 110, thus to start the shooting game. In this case, the wireless gun 200 may be an automatic rifle, a pistol, or a light machine gun. That is, the user may select the wireless gun 200. For reference, although not shown in the drawings, in this case, it is preferable that the wireless gun 200 is equipped with a separate device that can be detected by the beacon sensor 410 installed in the shooting space.

A sixth step (S60) is a step of performing a second setting. That is, the second setting is intended to change the internal configurations of the shooting space 110 by moving the structure 300, the laser recognition camera 500, and the image display unit 600 to predetermined positions according to the motion or position of the user during when the user plays the shooting game. For example, the beacon sensor 410 disposed on the ceiling of the shooting space 110 may detect the position and motion of the user, the height detection sensor 420 may photograph or detect the height from a head to feet of the user, and the optical sensor 430 may detect motion, action or direction, etc. of the user, for example.

In the fifth step (S50) and the sixth step (S60), depending on the shooting game menu or the difficulty preset by the user on the screen 620 of the image display unit 600, as shown in FIGS. 6 to 10, various images may be produced.

The user may remove the target objects that appear on the screen 620, and may perform concealment, cover, crawl, etc. using various structures 300 similar to the real battles. In this case, the plurality of various sensor units 400 installed on the ceiling and wall of the shooting space 110 detect the motion, movement, direction, etc. of the user, and thereby, the target object may appear on the screen 620 and move.

The target object and various backgrounds displayed on the screen 620 take predetermined actions, and when the motion of the user is detected by the sensor unit 400, the target objects may act according to the action of the user. For example, when the user approaches the screen, the target objects may aim at the user, fire, or escape. In addition, the target objects may also be concealed or covered by the structures appearing in the image to be photographed.

In addition, by pulling the trigger 210 of the wireless gun 200 by the user, the laser point 220 may be formed on the screen 620. In this case, the user may feel a recoil when firing by pulling the trigger 210. The wireless gun 200 may be provided with the recoil-inducing means (not shown) using air pressure, and the user may enjoy a more realistic and dynamic shooting game. As the recoil inducing means, an air compressor using such as the high pressure air (HPA) may be used, and the lithium-ion battery may be charged and used as a power source.

Meanwhile, it is preferable that the laser recognition camera 500 has a recognition range of the laser point 220 outside the screen 620 as well as the screen 620. When the user shoots a bullet by directing the direction of the wireless gun 200 to the outside of the screen 620, the laser recognition camera 500 recognizes the laser point 220 outside the screen 620, and the controller 800 may determine it is a misfire, and determine that the remaining bullets inside the wireless gun 200 have been decreased.

In addition, in a state in which a part of the screen 620 is covered by the structure 300, if the user pulls the trigger 210 to position the laser point 220 on the structure 300, and when the laser recognition camera 500 recognizes that the laser point 220 is located on the structure 300, the controller 800 may be determined it as a misfire. Further, the part where the laser point 220 was located in the structure 300 is preferably to produce bullet marks or breakage. If it is a structure (not shown) included in the image displayed on the screen 620 instead of the structure 220, the bullet mark or breakage may be produced on the structure by using technologies such as texture mapping.

A seventh step (S70) is a step of causing, by the controller 800, the user to exit the shooting space 110 when the shooting game is finished.

An eighth step (S80) is a step of calculating, by the controller 800, shooting game results and storing the calculated shooting game results and the shooting game contents in the main server 700. The user may review the shooting game results and shooting game contents stored in the main server 700 through the electronic device provided in the rest area or a display device such as a mobile phone.

The above description is merely an embodiment for implementing the screen shooting range and a method of playing a screen shooting game using artificial intelligence technologies, and the present invention is not limited to the above embodiment, but it will be understood by those skilled in the related art that various modifications and variations may be made therein without departing from the scope or gist of the present invention as defined by the appended claims.

DESCRIPTION OF REFERENCE NUMERALS

100: Set studio
110: Shooting space
200: Wireless gun
210: Trigger
220: Laser point
300: Structure
400: Sensor unit
410: Beacon sensor
420: Height detection sensor
430: Optical sensor
500: Laser recognition camera
600: Image display unit
610: Beam projector
620: Screen
700: Main server
800: Controller
L: Movement line of user

What is claimed is:

1. A method of playing a screen shooting game using artificial intelligence technologies, the method comprising:
a first step of receiving, by a controller, user information input by a user before entering a shooting space;
a second step of providing, by the controller, a plurality of shooting game menus to the user together with information on each shooting game;
a third step of causing, by the controller, the user to select a number of users to be played, select any one of the plurality of provided shooting game menus, and select a difficulty level of the selected shooting game from high, medium and low;
a fourth step of performing, by the controller, a first setting to set internal configurations of the shooting space by selecting a type, a position and a height of a structure which allows the user to be concealed and covered according to a manual stored in the main server in response to the shooting game and difficulty selected by the user, selecting an image projected by an image display unit, selecting positions of the structure and the image display unit in advance, and selecting a position of a laser recognition camera according to the position of the image display unit;

a fifth step of causing, by the controller, the user to hold a wireless gun and enter the shooting space, thus to start the shooting game;

a sixth step of performing, by the controller, a second setting to change the internal configurations of the shooting space by moving the structure, the laser recognition camera and the image display unit to predetermined positions according to a motion or position of the user during when the user plays the shooting game;

a seventh step of causing, by the controller, the user to exit the shooting space when the shooting game is finished; and an eighth step of calculating, by the controller, shooting game results and storing the calculated shooting game results and shooting game contents in a main server.

* * * * *